United States Patent
Akita et al.

(10) Patent No.: US 11,358,582 B2
(45) Date of Patent: Jun. 14, 2022

(54) CONTROLLER AND CONTROL METHOD FOR HYBRID VEHICLE

(71) Applicant: TOYOTA JIDOSHA KABUSHIKI KAISHA, Toyota (JP)

(72) Inventors: Shingo Akita, Toyota (JP); Takahiro Kondo, Toyota (JP); Akio Murasugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 16/752,744

(22) Filed: Jan. 27, 2020

(65) Prior Publication Data
US 2020/0269830 A1    Aug. 27, 2020

(30) Foreign Application Priority Data

Feb. 26, 2019    (JP) .............................. JP2019-032788

(51) Int. Cl.
*B60W 20/00*    (2016.01)
*B60K 6/547*    (2007.10)

(52) U.S. Cl.
CPC .............. *B60W 20/00* (2013.01); *B60K 6/547* (2013.01); *B60W 2510/083* (2013.01); *B60W 2510/1005* (2013.01); *B60W 2520/10* (2013.01); *B60W 2540/10* (2013.01); *B60W 2710/083* (2013.01); *B60W 2710/1005* (2013.01); *B60Y 2200/92* (2013.01)

(58) Field of Classification Search
CPC ... B60W 2710/083; B60W 2510/1005; B60W 20/00
See application file for complete search history.

(56) References Cited

FOREIGN PATENT DOCUMENTS

| DE | 102020134691 A1 | * | 7/2021 | ............. B60K 6/387 |
|---|---|---|---|---|
| JP | 2003-146115 A | | 5/2003 | |
| JP | 2006-200644 A | | 8/2006 | |
| JP | 2012-163131 A | | 8/2012 | |
| JP | 2014-125054 A | | 7/2014 | |
| JP | 2014125054 A | * | 7/2014 | |

* cited by examiner

*Primary Examiner* — Stacey A Fluhart
(74) *Attorney, Agent, or Firm* — Oblon, McClelland, Maier & Neustadt, L.L.P.

(57) ABSTRACT

A controller for a hybrid vehicle is configured to execute a shifting assist process of increasing torque of a motor when performing power-on downshift of an automatic transmission and an upper limit assist torque setting process of setting an upper limit assist torque that is an upper limit value of a travel assist torque to be a smaller value when a maximum step number of the power-on downshift is large than when the maximum step number is small.

5 Claims, 3 Drawing Sheets

CONTROLLER AND CONTROL METHOD FOR HYBRID VEHICLE

BACKGROUND

1. Field

The following description relates to a controller and a control method for a hybrid vehicle including a multi-speed automatic transmission.

2. Description of Related Art

In hybrid vehicles having two types of drive sources, namely, an engine and a motor, a known one includes a multi-speed automatic transmission that sets any one of multiple gears. The multi-speed automatic transmission includes planetary gear mechanisms and friction engagement elements. The multi-speed automatic transmission is configured to switch the gear by changing a combination of engaged states of the friction engagement elements. In such a hybrid vehicle, power-on downshift is performed to change the gear of the automatic transmission to a low-speed gear in accordance with the depression of the accelerator pedal.

During a period from the beginning to the completion of power-on downshift, a drive force of the vehicle cannot be gained. This causes the vehicle to accelerate slowly. Japanese Laid-Open Patent Publication No. 2006-200644 describes a technique used for a hybrid vehicle in which a motor is arranged on a power transmission path from the automatic transmission to wheel assemblies. In this technique, the motor is used to give torque to the wheel assemblies such that a drive force of the vehicle smoothly increases even during the execution of power-on downshift.

To perform power-on downshift, the rotation speed of a transmission input shaft needs to be increased. Hybrid vehicles having the above-described multi-speed automatic transmission include a known one in which a motor is connected to a transmission input shaft. In such a hybrid vehicle, a large torque is required to increase the rotation speed of the transmission input shaft by an amount corresponding to the inertia of the motor. Also, in such a hybrid vehicle, a long time is required for the power-on downshift to complete.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect provides a controller configured to control a hybrid vehicle. The hybrid vehicle includes an engine installed in the hybrid vehicle, an onboard power supply, a motor that generates power when powered by the onboard power supply, and a multi-speed automatic transmission arranged on a portion between the motor and a wheel assembly in a power transmission path of the engine and the motor with the wheel assembly. The controller is configured to execute a shifting process of changing a gear of the automatic transmission to a target gear, the target gear being determined based on a depression amount of an accelerator pedal and a vehicle speed, a travel assist torque determination process of determining a travel assist torque generated by the motor as a drive force of the hybrid vehicle in accordance with a target drive force of the hybrid vehicle, the target drive force being determined based on the depression amount of the accelerator pedal and the vehicle speed, a shifting assist process of increasing torque of the motor when performing power-on downshift of the automatic transmission, and an upper limit assist torque setting process of setting an upper limit assist torque that is an upper limit value of the travel assist torque to be a smaller value when a maximum step number of the power-on downshift is large than when the maximum step number is small, the maximum step number being defined as a difference between a current gear and the target gear set in a case in which the depression amount of the accelerator pedal is a maximum value at a current vehicle speed.

Generally, as the number of gears downshifted in downshift increases, the torque required to smoothly increase the rotation speed of the transmission input shaft in power-on downshift increases. The above-described maximum step number indicates the maximum value of the number of gears downshifted in power-on downshift that is implemented when the accelerator pedal is maximally depressed in the current travel state of the vehicle, that is, the maximum value of the number of gears downshifted in power-on downshift that may be implemented in the current travel state of the vehicle. Thus, as long as the reserve torque of the motor is obtained in accordance with the maximum step number, the motor can smoothly generate torque required to increase the rotation speed of the transmission input shaft whenever power-on downshift is performed. Further, as the difference of the travel assist torque from the maximum torque of the motor increases, the torque that can be provided by the motor to assist the rotation speed of the transmission input shaft in power-on downshift increases. In the controller for the above-described hybrid vehicle, the upper limit value, which is the upper limit value of the travel assist torque, is set as a value that decreases as the maximum step number increases. Thus, the room for a torque increase of the motor that quickly increases the rotation speed of the transmission input shaft can be constantly obtained such that power-on downshift can be performed at any time. This allows the controller of the above-described hybrid vehicle to smoothly implement power-on downshift during a short time.

The maximum torque of the motor changes depending on the charge state of the onboard power supply. Further, even if the value of the reserve torque of the motor required for power-on downshift is the same, the value of the upper limit assist torque required to obtain the reserve torque for the power-on downshift changes when the maximum torque changes. Thus, in the upper limit assist torque setting process, it is desired that the reserve torque be calculated based on the depression amount of the accelerator pedal and the vehicle speed as a larger value when the maximum step number is large than when the maximum step number is small. Also, in the upper limit assist torque setting process, it is desired that the difference obtained by subtracting the reserve torque from the maximum torque of the motor determined in accordance with the charge state of the onboard power supply be set as the value of the upper limit assist torque.

When the maximum step number is large, the reserve torque that should be obtained in preparation for power-on downshift is large, and a decrease occurs in the ratio of the motor torque that can be allocated as the travel assist torque. Generally, in the hybrid vehicle, the charge and discharge amounts of the onboard power supply are controlled in order to keep the charge state of the onboard power supply within a certain range. In the control of the charge and discharge amounts, the maximum torque determination process is performed to determine the maximum torque as a larger value when the difference obtained by subtracting the target value of the charge state of the onboard power supply from the current value of the charge state than when the difference is small. In a case in which the maximum torque determination process is performed, the target charge state determination process simply needs to be performed to determine the target value of the charge state based on the depression amount of the accelerator pedal as a smaller value when the depression amount is small than when the depression amount is large. In such a case, when the depression amount of the accelerator pedal is small, the target value of the charge state is set to a small value so that an increase occurs in an allowable discharge amount of the power supply of the vehicle body. Thus, even when the reserve torque that should be obtained in preparation for power-on downshift is large, the travel assist torque is not easily limited.

Another aspect provides a method for controlling a hybrid vehicle. The hybrid vehicle includes an engine installed in the hybrid vehicle, an onboard power supply, a motor that generates power when powered by the onboard power supply, and a multi-speed automatic transmission arranged on a portion between the motor and a wheel assembly in a power transmission path of the engine and the motor with the wheel assembly. The method includes changing a gear of the automatic transmission to a target gear, the target gear being determined based on a depression amount of an accelerator pedal and a vehicle speed, determining a travel assist torque generated by the motor as a drive force of the hybrid vehicle in accordance with a target drive force of the hybrid vehicle, the target drive force being determined based on the depression amount of the accelerator pedal and the vehicle speed, increasing torque of the motor when performing power-on downshift of the automatic transmission, and setting an upper limit assist torque that is an upper limit value of the travel assist torque to be a smaller value when a maximum step number of the power-on downshift is large than when the maximum step number is small, the maximum step number being defined as a difference between a current gear and the target gear set in a case in which the depression amount of the accelerator pedal is a maximum value at a current vehicle speed.

A further aspect provides a controller configured to control a hybrid vehicle. The hybrid vehicle includes an engine installed in the hybrid vehicle, an onboard power supply, a motor that generates power when powered by the onboard power supply, and a multi-speed automatic transmission arranged on a portion between the motor and a wheel assembly in a power transmission path of the engine and the motor with the wheel assembly. The controller includes processing circuitry. The processing circuitry is configured to execute a shifting process of changing a gear of the automatic transmission to a target gear, the target gear being determined based on a depression amount of an accelerator pedal and a vehicle speed, a travel assist torque determination process of determining a travel assist torque generated by the motor as a drive force of the hybrid vehicle in accordance with a target drive force of the hybrid vehicle, the target drive force being determined based on the depression amount of the accelerator pedal and the vehicle speed, a shifting assist process of increasing torque of the motor when performing power-on downshift of the automatic transmission, and an upper limit assist torque setting process of setting an upper limit assist torque that is an upper limit value of the travel assist torque to be a smaller value when a maximum step number of the power-on downshift is large than when the maximum step number is small, the maximum step number being defined as a difference between a current gear and the target gear set in a case in which the depression amount of the accelerator pedal is a maximum value at a current vehicle speed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for a hybrid vehicle according to an embodiment will now be described in detail with reference to FIGS. 1 to 5. First, the configuration of a drive system of the hybrid vehicle of the present embodiment will be described with reference to FIG. 1.

Figure 1:
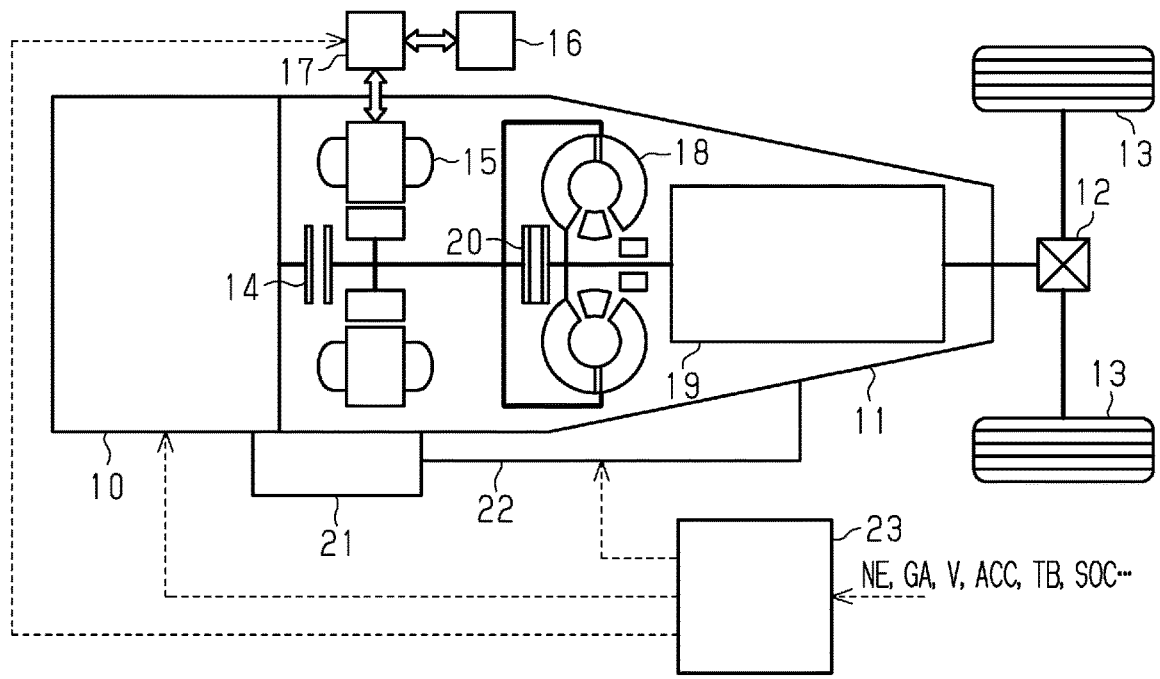
FIG. 1 is a schematic diagram showing the configuration of a controller for a hybrid vehicle according to an embodiment and the configuration of a drive system of the hybrid vehicle in which the controller is installed.

As shown in FIG. 1, a shifting unit 11 is arranged on a power transmission path from an engine 10 to wheel assemblies 13 in the hybrid vehicle. The shifting unit 11 and the left and right wheel assemblies 13 are coupled to each other by a differential 12 in a drivable manner.

The shifting unit 11 includes a clutch 14 and a motor generator 15 (M/G 15), which serves as a motor. In the shifting unit 11, the M/G 15 is located on the power transmission path from the engine 10 to the wheel assemblies 13. The clutch 14 is located on a portion of the power transmission path between the engine 10 and the M/G 15.

When supplied with hydraulic pressure, the clutch 14 becomes engaged to connect the power transmission between the engine 10 and the M/G 15. When the supply of hydraulic pressure to the clutch 14 is stopped, the clutch 14 becomes disengaged to disconnect the power transmission between the engine 10 and the M/G 15.

The M/G 15 is connected to an onboard power supply 16 by an inverter 17. The M/G 15 functions as a motor that generates a drive force of the vehicle when powered by the onboard power supply 16 and also functions as a generator that generates electricity for charging the onboard power supply 16 when power is transmitted from the engine 10 or the wheel assemblies 13. The electricity transmitted and received to and from the M/G 15 and the onboard power supply 16 is adjusted by the inverter 17.

The shifting unit 11 also includes a torque converter 18 and a multi-speed automatic transmission 19. The torque converter 18 is a fluid coupling that has a torque amplification function. The automatic transmission 19 switches the gear ratio in multiple stages by switching the gear. In the present embodiment, the automatic transmission 19 is capable of switching the gear in ten stages from first gear to tenth gear. In the shifting unit 11, the automatic transmission 19 is arranged on a portion of the power transmission path between the M/G 15 and the wheel assemblies 13. The M/G 15 and the automatic transmission 19 are coupled to each other by the torque converter 18. The torque converter 18 includes a lock-up clutch 20. When supplied with hydraulic pressure, the lock-up clutch 20 becomes engaged to directly couple the M/G 15 and the automatic transmission 19 to each other.

The shifting unit 11 further includes an oil pump 21 and a hydraulic pressure control unit 22. The hydraulic pressure generated by the oil pump 21 is supplied by the hydraulic pressure control unit 22 to the clutch 14, the torque converter 18, the automatic transmission 19, and the lock-up clutch 20. The hydraulic pressure control unit 22 includes hydraulic circuits for the clutch 14, the torque converter 18, the automatic transmission 19, and the lock-up clutch 20. The hydraulic pressure control unit 22 also includes various types of hydraulic control valves for controlling the hydraulic pressures of these components.

In addition, the hybrid vehicle includes a vehicle control unit 23. The vehicle control unit 23 is an electronic control unit including a calculation processor that performs various types of calculation processes for travel control of the vehicle and a storage device that stores programs and data for control. The vehicle control unit 23 receives detection signals such as a rotation speed NE of the engine 10, an intake air amount Ga of the engine 10, a vehicle speed V of the vehicle, a depression amount ACC of the accelerator pedal, the temperature of hydraulic oil (oil temperature THO) in the shifting unit 11, and a state of charge (SOC) of the onboard power supply 16. In the SOC, percentage is used to indicate the ratio of the remaining amount to the full charge amount of the onboard power supply 16. Based on these detection signals, the vehicle control unit 23 performs the travel control of the vehicle. The travel control of the vehicle includes the control of the operating state (intake amount or fuel injection amount) of the engine 10 and the control of driving-regenerative torque of the M/G 15 through the adjustment of the amount of electricity transmitted and received to and from the onboard power supply 16 by the inverter 17. The travel control also includes the control of the clutch 14, the torque converter 18, the automatic transmission 19, and the lock-up clutch 20 through the drive control of hydraulic pressure valves of the hydraulic pressure control unit 22.

Figure 2:
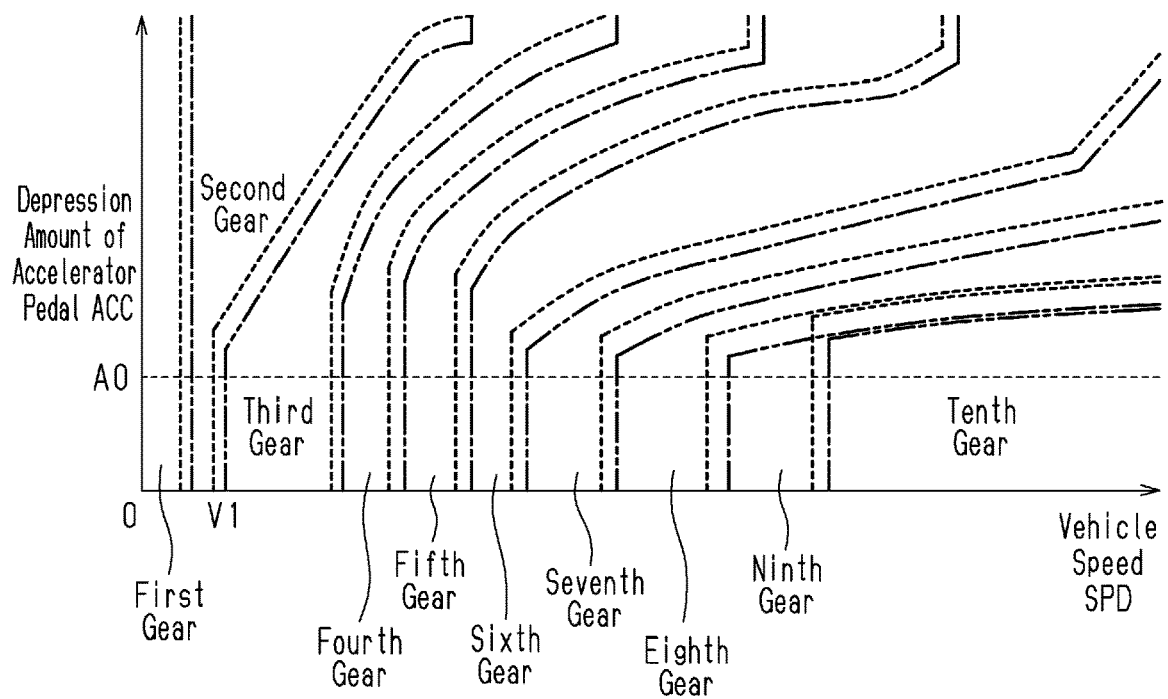
FIG. 2 is a graph showing a shifting map of the automatic transmission in the hybrid vehicle.

FIG. 2 shows a shifting map of the automatic transmission 19 in the present embodiment. In the shifting map of FIG. 2, the long dashed double-short dashed lines show downshift lines, and the dotted lines show upshift lines. The vehicle control unit 23 is configured to determine a target gear in accordance with such a shifting map and control the switching of the gear of the automatic transmission 19. In the present embodiment, the process of determining the target gear and controlling the switching of the gear performed by the vehicle control unit 23 in such a manner corresponds to a shifting process.

In the hybrid vehicle subject to the application of the present embodiment as described above, the M/G 15 is connected to a transmission input shaft, which is the input shaft of the automatic transmission 19. Such a hybrid vehicle may need a larger torque for increasing the rotation speed of the transmission input shaft in power-on downshift by an amount corresponding to the inertia of the M/G 15 and may need a longer time for the power-on downshift to complete than an engine vehicle in which only an engine is installed as a drive source. In the vehicle control unit 23, a shifting assist is performed to increase the torque of the M/G 15 by an amount corresponding to the inertia of the M/G 15 during power-on downshift. This allows the power-on downshift to complete within the same time as when the M/G 15 is not provided. As the number of gears downshifted in power-on downshift increases, the torque increase amount of the M/G 15 required for the shifting assist becomes large. Additionally, even if the number of gears downshifted in downshift is the same, the torque increase amount of the M/G 15 required for the shifting assist becomes large as the vehicle speed V increases. In the present embodiment, the process of increasing the torque of the M/G 15 to perform such a power-on downshift by the vehicle control unit 23 corresponds to a shifting assist process.

Additionally, the vehicle control unit 23 performs a charge-discharge control of the onboard power supply 16. The charge-discharge control determines an upper limit discharge amount WOUT and an upper limit charge amount WIN in accordance with the SOC of the onboard power supply 16. The upper limit discharge amount WOUT is an upper limit value of the discharge amount of the onboard power supply 16, and the upper limit charge amount WIN is an upper limit value of the charge amount of the onboard power supply 16. In the present embodiment, the vehicle control unit 23 refers to the depression amount ACC of the accelerator pedal to determine the upper limit discharge amount WOUT and the upper limit charge amount WIN.

Figure 3:
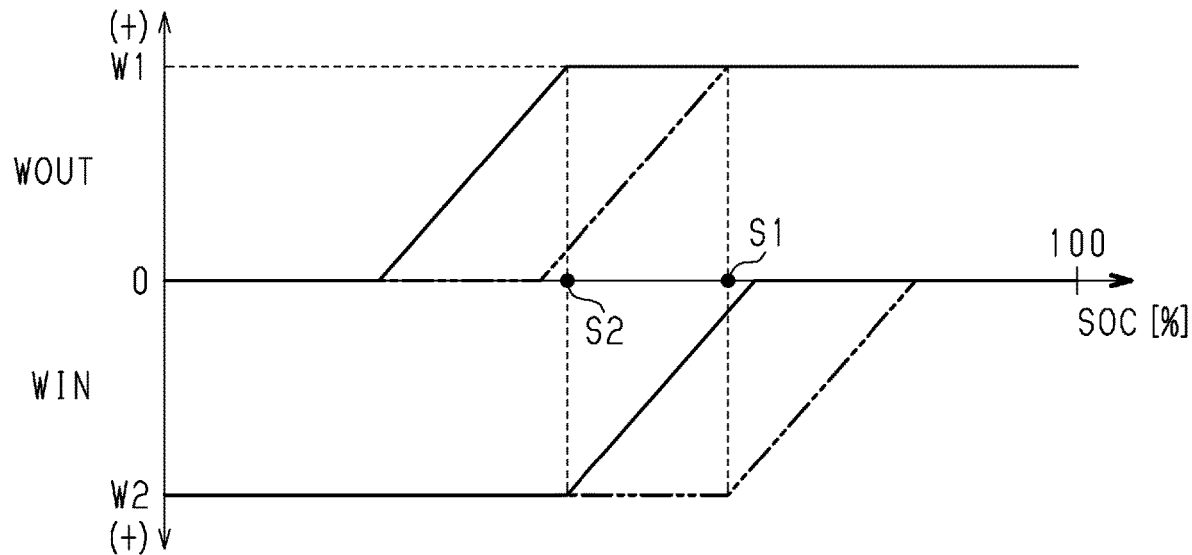
FIG. 3 is a graph showing the relationship between a state of charge (SOC) and a depression amount of an accelerator pedal with an upper limit discharge amount and an upper limit charge amount in a charge-discharge control performed in the controller.

In FIG. 3, the solid lines show the relationship between the upper limit discharge amount WOUT and the upper limit charge amount WIN with the SOC of the onboard power supply 16 when the depression amount ACC of the accelerator pedal is less than or equal to a preset value A0. In FIG. 3, the long dashed double-short dashed lines show the relationship between the upper limit discharge amount WOUT and the upper limit charge amount WIN with the SOC of the onboard power supply 16 when the depression amount ACC of the accelerator pedal exceeds the preset value A0.

When the depression amount ACC of the accelerator pedal is less than or equal to the preset value A0, a preset value S2 is set as the value of a target SOC, which is a target value of the SOC. At this time, when the SOC is decreased from 100 percent, the upper limit discharge amount WOUT is set to a preset value W1 until the SOC becomes less than S2. When the SOC further decreases from S2, the upper limit discharge amount WOUT is set so as to gradually decrease from the preset value W1 to zero. At this time, when the SOC is increased from zero, the upper limit charge amount WIN is set to a preset value W2 until the SOC exceeds S2. When the SOC exceeds S2 and further increases, the upper limit charge amount WIN is set so as to gradually decrease from the preset value W2 to zero.

When the depression amount ACC of the accelerator pedal exceeds the preset value A0, S1, which is greater than the above-described value S2, is set as the value of the target SOC. At this time, when the SOC is decreased from 100 percent, the upper limit discharge amount WOUT is set to a preset value W1 until the SOC becomes less than S1. When the SOC further decreases from S1, the upper limit discharge amount WOUT is set so as to gradually decrease from the preset value W1 to zero. At this time, when the SOC is gradually increased from zero, the upper limit charge amount WIN is set to the preset value W2 until the SOC exceeds S1. When the SOC exceeds S1 and further increases, the upper limit charge amount WIN is set so as to gradually decrease from the preset value W2 to zero.

The vehicle control unit 23 is configured to control the driving-regenerative torque of the M/G 15 within a range in which the discharge amount of the onboard power supply 16 is less than or equal to the upper limit discharge amount WOUT and the charge amount of the onboard power supply 16 is less than or equal to the upper limit charge amount WIN. This keeps the SOC of the onboard power supply 16 at a value close to the target SOC. In this manner, in the present embodiment, when the depression amount ACC of the accelerator pedal exceeds the preset value A0, the vehicle control unit 23 determines the value of the target SOC, which is a target value of the SOC, based on the depression amount ACC as a value greater than when the depression amount ACC is less than or equal to the preset value A0. In the present embodiment, the process of determining the value of the target SOC performed by the vehicle control unit 23 in such a manner corresponds to a target charge state determination process.

Further, the vehicle control unit 23 is configured to perform a travel assist control using the M/G 15. The amount of the torque generated in such a travel assist control by the M/G 15 as a drive force of the hybrid vehicle, that is, the amount of a travel assist torque TR, is determined through the process of a travel assist torque calculation routine.

Figure 4:
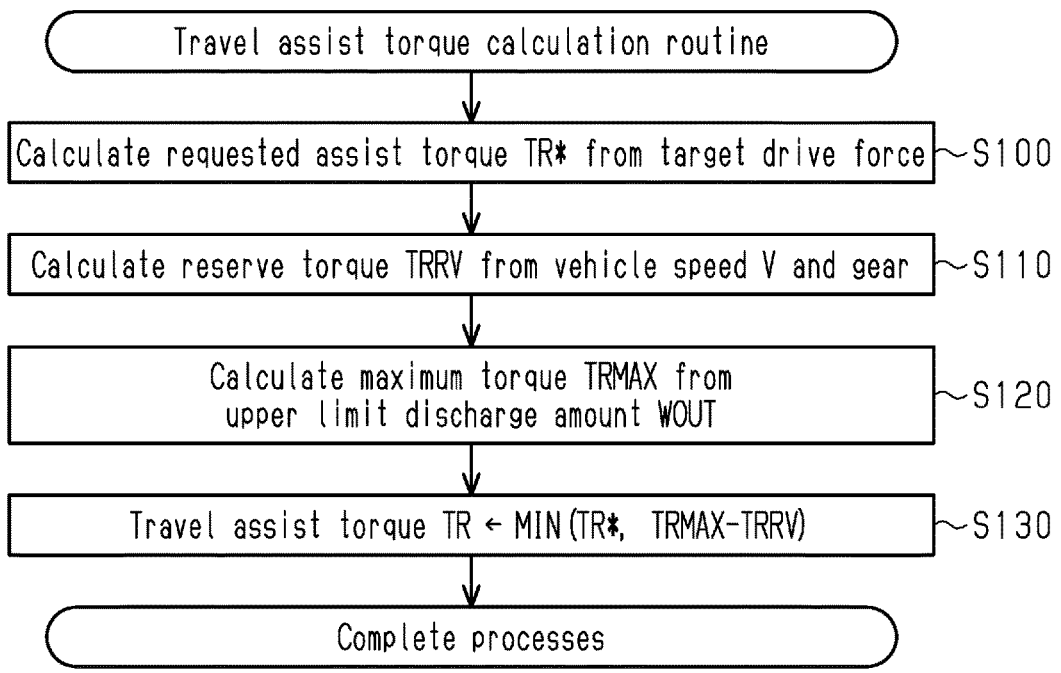
FIG. 4 is a flowchart showing a travel assist torque calculation routine performed in the controller.

FIG. 4 shows a flowchart of the travel assist torque calculation routine. The vehicle control unit 23 repeatedly executes the process of this routine in preset control cycles while the hybrid vehicle is traveling.

When starting the process of this routine, in step S100, the vehicle control unit 23 first calculates the value of a requested assist torque TR* from a target drive force of the vehicle. The target drive force is determined by parameters such as the vehicle speed V and the depression amount ACC of the accelerator pedal. As the target drive force increases, a larger value is calculated as the value of the requested assist torque TR*.

Subsequently, in step S110, the vehicle control unit 23 calculates the value of a reserve torque TRRV from the current vehicle speed V and the gear of the automatic transmission 19. The reserve torque TRRV indicates the torque increase amount of the M/G 15 required to assist the power-on downshift of the automatic transmission 19 that is implemented when the accelerator pedal is maximally depressed in the current travel state of the vehicle.

Figure 5:
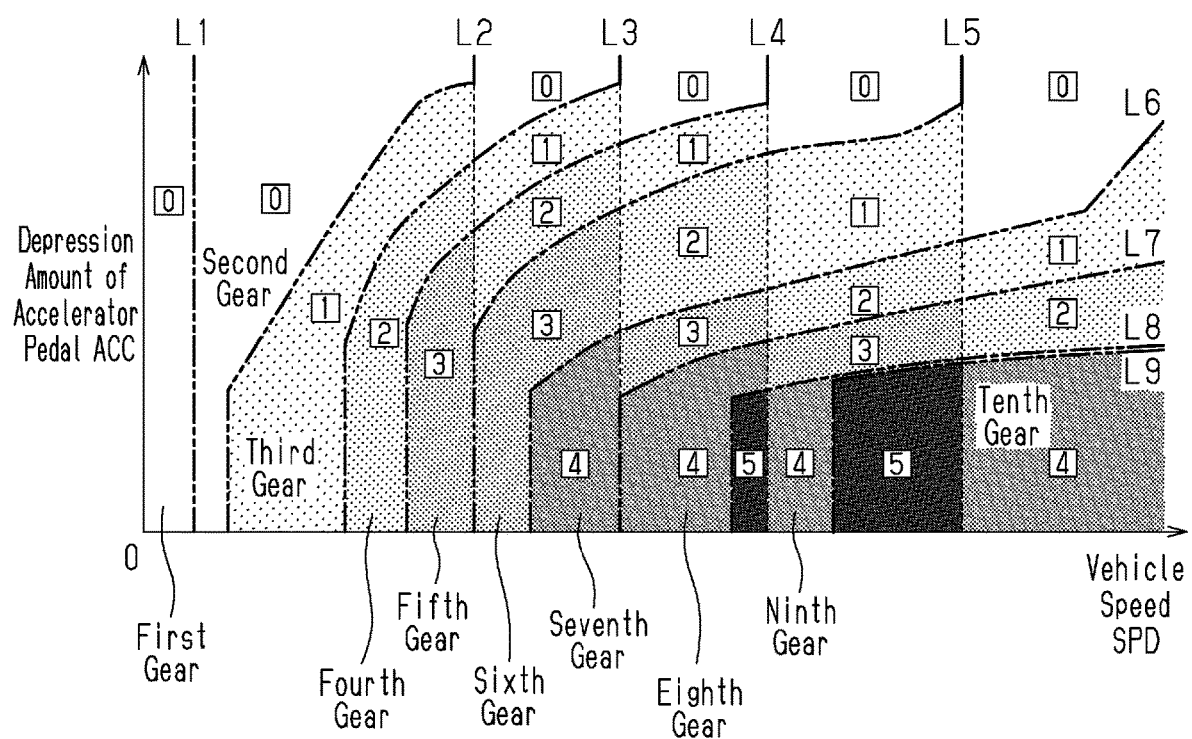
FIG. 5 is a graph showing the relationship between the depression amount of the accelerator pedal and a vehicle speed with the maximum step number of power-on downshift in the controller when the vehicle is traveling normally.

FIG. 5 shows downshift lines L1 to L9 in the shifting map of the automatic transmission. In FIG. 5, each of the boxed numbers indicates the maximum step number of power-on downshift performed when the vehicle is traveling normally in each of the regions differentiated by the types of hatching in FIG. 5 with the gear of the automatic transmission 19 coinciding with the target gear. The maximum step number of power-on downshift indicates the difference between the current gear and the target gear set when the depression amount ACC of the accelerator pedal is the maximum value of the depression amount ACC at the current vehicle speed V. The value of the maximum step number is the maximum value of the number of gears downshifted during power-on downshift that may be implemented in the current travel status of the vehicle. In the above-described step S110, when the maximum step number of power-on downshift is zero, zero is calculated as the value of the reserve torque TRRV. In a case in which the maximum step number of power-on downshift is greater than or equal to 1, the value of the reserve torque TRRV is calculated to be larger when the maximum step number is large than when the maximum step number is small. Even if the maximum step number is the same number greater than or equal to 1, the value set for the reserve torque TRRV differs depending on the vehicle speed V.

Subsequently, in step S120, the vehicle control unit 23 calculates the value of a maximum torque TRMAX of the M/G 15 from the upper limit discharge amount WOUT of the onboard power supply 16. More specifically, the torque generated by the M/G 15 through powering of an amount corresponding to the upper limit discharge amount WOUT is calculated as the value of the maximum torque TRMAX. As described above, the upper limit discharge amount WOUT is set as a value that gradually decreases when the SOC of the onboard power supply 16 falls below the target value. Thus, in a case in which the difference obtained by subtracting the target value of the SOC of the onboard power supply 16 from the current value of the SOC is greater than zero, the value of the maximum torque TRMAX is determined as a value greater than when the difference is less than zero.

Then, in step S130, the vehicle control unit 23 calculates, as the value of the travel assist torque TR, the smaller one of two values, namely, the requested assist torque TR* and the difference obtained by subtracting the reserve torque TRRV from the maximum torque TRMAX (=TRMAX−TRRV). That is, in the present embodiment, the value of the travel assist torque TR of the M/G 15 is determined with the difference obtained by subtracting the reserve torque TRRV from the maximum torque TRMAX set as the upper limit value. After the travel assist torque TR is determined in this manner, the process of the present routine is ended.

In the present embodiment, a series of processes in such a travel assist torque calculation routine performed by the vehicle control unit 23 corresponds to a travel assist torque determination process. The process of step S130 in this routine corresponds to an upper limit assist torque setting process. The difference obtained by subtracting the reserve torque TRRV from the maximum torque TRMAX corresponds to an upper limit assist torque, which is the upper limit value of the travel assist torque TR. The process of step S120 in this routine corresponds to a maximum torque determination process.

The operation and advantages of the present embodiment will now be described.

Generally, as the number of gears downshifted in downshift increases, the torque required to smoothly increase the rotation speed of the transmission input shaft in power-on downshift increases. In the controller for the hybrid vehicle of the present embodiment, the reserve torque TRRV is set in accordance with the maximum step number of power-on downshift hypothesized from the current vehicle speed V and the gear of the automatic transmission 19. The difference obtained by subtracting the reserve torque TRRV from the maximum torque TRMAX of the M/G 15 is set as the value of the upper limit assist torque, which is the upper limit value of the travel assist torque TR. This allows the motor to smoothly assist downshifting whenever power-on downshift is performed.

When the maximum step number is large, the reserve torque that should be obtained in preparation for power-on downshift is large. By this amount, a decrease occurs in the ratio in the torque of the M/G 15 that can be allocated as the travel assist torque TR. Generally, at the same vehicle speed V, the target gear of the automatic transmission 19 is set to a high-speed gear (i.e., higher gear) as the depression amount ACC of the accelerator pedal becomes small. Thus, when the depression amount ACC of the accelerator pedal is small, the maximum step number of power-on downshift is large. In this case, it is difficult to obtain the travel assist torque TR having a requested amount.

In the present embodiment, when the depression amount ACC of the accelerator pedal is small, the target SOC is lowered. That is, when the depression amount ACC of the accelerator pedal is small, the target SOC is S2. When the target SOC is lowered, the upper limit discharge amount WOUT of the onboard power supply 16 increases so that the maximum torque TRMAX of the M/G 15 increases. The range in which the upper limit discharge amount WOUT is the preset value W1 with the target SOC set as S2 is broader than the range in which the upper limit discharge amount WOUT is the preset value W1 with the target SOC set as S1. Thus, even when the reserve torque that should be obtained in preparation for power-on downshift is large, the travel assist torque TR is not easily limited.

The present embodiment may be modified as follows. The present embodiment and the following modifications can be combined as long as the combined modifications remain technically consistent with each other.

In the above-described embodiment, the target SOC of the onboard power supply 16 is determined in accordance with the depression amount ACC of the accelerator pedal. Instead, the target SOC may be determined without using the depression amount ACC.

In the above-described embodiment, the travel assist torque TR is calculated such that the difference obtained by subtracting the reserve torque TRRV from the maximum torque TRMAX of the M/G 15 is the upper limit value. Instead, the value of the upper limit assist torque may be determined directly by the vehicle speed V and the depression amount ACC of the accelerator pedal such that the value of the upper limit assist torque is smaller when the maximum step number of power-on downshift is large than when the maximum step number of power-on downshift is small.

The hybrid vehicle subject to the application of the above-described embodiment is equipped with the M/G 15, which both functions as a motor and a generator. The M/G 15 may be replaced with a motor having a single function that does not generate power.

In the above-described embodiment, the control of the travel assist torque of the M/G 15 may be applied to the control of the motor arranged on the input side of the automatic transmission in a two-motor hybrid vehicle in which motors are respectively arranged on the input side and the output side of the automatic transmission.

The vehicle control unit 23 is not limited to a device that includes a CPU and a memory and executes software processing. For example, at least part of the processes executed by the software in the above-described embodiment may be executed by hardware circuits dedicated to execution of these processes (such as ASIC). That is, the vehicle control unit 23 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller configured to control a hybrid vehicle, wherein
the hybrid vehicle includes
an engine installed in the hybrid vehicle,
an onboard power supply,
a motor that generates power when powered by the onboard power supply, and
a multi-speed automatic transmission arranged on a portion between the motor and a wheel assembly in a power transmission path of the engine and the motor with the wheel assembly, and
the controller is configured to execute:
a shifting process of changing a gear of the automatic transmission to a target gear, the target gear being determined based on a depression amount of an accelerator pedal and a vehicle speed;
a travel assist torque determination process of determining a travel assist torque generated by the motor as a drive force of the hybrid vehicle in accordance with a target drive force of the hybrid vehicle, the target drive force being determined based on the depression amount of the accelerator pedal and the vehicle speed;

a shifting assist process of increasing torque of the motor when performing power-on downshift of the automatic transmission; and an upper limit assist torque setting process of setting an upper limit assist torque that is an upper limit value of the travel assist torque to be a smaller value when a maximum step number of the power-on downshift is large than when the maximum step number is small, the maximum step number being defined as a difference between a current gear and the target gear set in a case in which the depression amount of the accelerator pedal is a maximum value at a current vehicle speed.

2. The controller according to claim 1, wherein the upper limit assist torque setting process includes calculating a reserve torque based on the depression amount of the accelerator pedal and the vehicle speed as a larger value when the maximum step number is large than when the maximum step number is small, and setting, as a value of the upper limit assist torque, a difference obtained by subtracting the reserve torque from a maximum torque of the motor determined in accordance with a charge state of the onboard power supply.

3. The controller according to claim 2, wherein
the controller is configured to execute:

a maximum torque determination process of determining the maximum torque as a larger value when a difference obtained by subtracting a target value of the charge state of the onboard power supply from a current value of the charge state than when the difference is small; and a target charge state determination process of determining the target value of the charge state based on the depression amount of the accelerator pedal as a smaller value when the depression amount is small than when the depression amount is large.

4. A method for controlling a hybrid vehicle, wherein the hybrid vehicle includes
an engine installed in the hybrid vehicle,
an onboard power supply,
a motor that generates power when powered by the onboard power supply, and
a multi-speed automatic transmission arranged on a portion between the motor and a wheel assembly in a power transmission path of the engine and the motor with the wheel assembly, and
the method comprises:

changing a gear of the automatic transmission to a target gear, the target gear being determined based on a depression amount of an accelerator pedal and a vehicle speed;

determining a travel assist torque generated by the motor as a drive force of the hybrid vehicle in accordance with a target drive force of the hybrid vehicle, the target drive force being determined based on the depression amount of the accelerator pedal and the vehicle speed;

increasing torque of the motor when performing power-on downshift of the automatic transmission; and setting an upper limit assist torque that is an upper limit value of the travel assist torque to be a smaller value when a maximum step number of the power-on downshift is large than when the maximum step number is small, the maximum step number being defined as a difference between a current gear and the target gear set in a case in which the depression amount of the accelerator pedal is a maximum value at a current vehicle speed.

5. A controller configured to control a hybrid vehicle, wherein
the hybrid vehicle includes
an engine installed in the hybrid vehicle,
an onboard power supply,
a motor that generates power when powered by the onboard power supply, and
a multi-speed automatic transmission arranged on a portion between the motor and a wheel assembly in a power transmission path of the engine and the motor with the wheel assembly,
the controller comprises processing circuitry, and
the processing circuitry is configured to execute:

a shifting process of changing a gear of the automatic transmission to a target gear, the target gear being determined based on a depression amount of an accelerator pedal and a vehicle speed;

a travel assist torque determination process of determining a travel assist torque generated by the motor as a drive force of the hybrid vehicle in accordance with a target drive force of the hybrid vehicle, the target drive force being determined based on the depression amount of the accelerator pedal and the vehicle speed;

a shifting assist process of increasing torque of the motor when performing power-on downshift of the automatic transmission; and an upper limit assist torque setting process of setting an upper limit assist torque that is an upper limit value of the travel assist torque to be a smaller value when a maximum step number of the power-on downshift is large than when the maximum step number is small, the maximum step number being defined as a difference between a current gear and the target gear set in a case in which the depression amount of the accelerator pedal is a maximum value at a current vehicle speed.

* * * * *